US012579308B1

(12) United States Patent
Joshi et al.

(10) Patent No.: US 12,579,308 B1
(45) Date of Patent: Mar. 17, 2026

(54) TOKENIZATION WITH FORMAT PRESERVATION

(71) Applicant: Capital One Services, LLC, McLean, VA (US)

(72) Inventors: Rohit Joshi, Glen Allen, VA (US); Hao Cheng, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/232,164

(22) Filed: Jun. 9, 2025

(51) Int. Cl.
  *G06F 21/62* (2013.01)
  *G06F 21/60* (2013.01)

(52) U.S. Cl.
  CPC ........ *G06F 21/6245* (2013.01); *G06F 21/602* (2013.01)

(58) Field of Classification Search
  CPC ..... G06F 21/602; G06F 21/6245; G06F 21/31
  USPC ............................................. 713/182; 380/28
  See application file for complete search history.

(56) References Cited

U.S. PATENT DOCUMENTS

| | | | | |
|---|---|---|---|---|
| 4,361,868 | A * | 11/1982 | Kaplinsky | ........... G06F 12/0292 |
| | | | | 711/2 |
| 6,507,846 | B1 * | 1/2003 | Consens | ............. G06F 16/2237 |
| | | | | 707/999.009 |
| 8,599,048 | B2 * | 12/2013 | Shalev | .................... H03M 7/30 |
| | | | | 341/51 |
| 9,736,142 | B2 | 8/2017 | Davis et al. | |
| 10,607,017 | B2 | 3/2020 | Kumar et al. | |
| 10,623,181 | B2 | 4/2020 | Iyer et al. | |
| 10,951,392 | B2 | 3/2021 | Pivovarov | |
| 11,263,335 | B2 | 3/2022 | Parthasarathy | |
| 12,021,847 | B2 | 6/2024 | Cheng et al. | |
| 12,106,290 | B2 | 10/2024 | Cacioppo | |
| 2011/0227765 | A1 * | 9/2011 | Shalev | ..................... H03M 7/30 |
| | | | | 341/87 |
| 2011/0231485 | A1 * | 9/2011 | Shalev | .................... H03M 7/30 |
| | | | | 709/203 |
| 2011/0277021 | A1 * | 11/2011 | Ogawa | .................... G06F 21/36 |
| | | | | 726/6 |
| 2016/0358163 | A1 * | 12/2016 | Kumar | ............... G06Q 20/3823 |
| 2018/0182406 | A1 * | 6/2018 | Moriya | ................... G10L 25/90 |
| 2020/0136800 | A1 * | 4/2020 | Moon | .................. H04L 9/0869 |
| 2020/0136801 | A1 * | 4/2020 | Moon | .................. H04L 9/0869 |
| 2021/0152186 | A1 * | 5/2021 | Jang | ...................... H03M 13/29 |
| 2022/0405099 | A1 | 12/2022 | Farkash et al. | |
| 2023/0028304 | A1 * | 1/2023 | Shroff | .................. G06F 40/216 |
| 2023/0379138 | A1 | 11/2023 | Lin et al. | |
| 2024/0078334 | A1 | 3/2024 | Joshi et al. | |

OTHER PUBLICATIONS

NPL Search Terms (Year: 2025).*

* cited by examiner

*Primary Examiner* — Syed A Zaidi
(74) *Attorney, Agent, or Firm* — Sterne, Kessler, Goldstein & Fox P.L.L.C.

(57) ABSTRACT

Disclosed herein are system, method, and computer program product embodiments for tokenization by obfuscating a length of personal information through addition of one or more digits and modifying a base of the input string before encryption. In one process, a security string is added to a user information input string of a first length and first base to generate a second string of a longer length, a format preserving encryption (FPE) is performed to generate a new string of the another length and base, and converted into a token of the first length but different base.

20 Claims, 7 Drawing Sheets

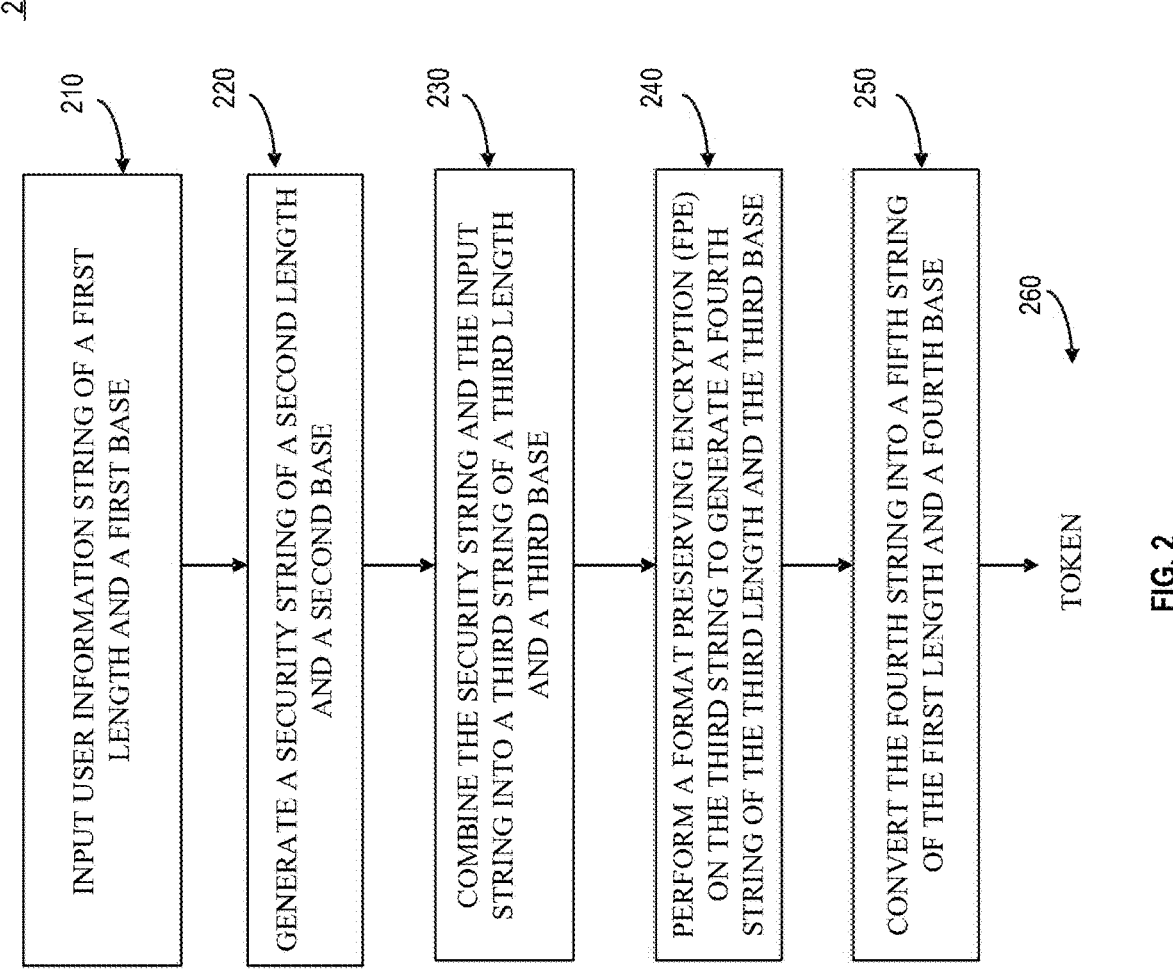

200

210 INPUT USER INFORMATION STRING OF A FIRST LENGTH AND A FIRST BASE

220 GENERATE A SECURITY STRING OF A SECOND LENGTH AND A SECOND BASE

230 COMBINE THE SECURITY STRING AND THE INPUT STRING INTO A THIRD STRING OF A THIRD LENGTH AND A THIRD BASE

240 PERFORM A FORMAT PRESERVING ENCRYPTION (FPE) ON THE THIRD STRING TO GENERATE A FOURTH STRING OF THE THIRD LENGTH AND THE THIRD BASE

250 CONVERT THE FOURTH STRING INTO A FIFTH STRING OF THE FIRST LENGTH AND A FOURTH BASE

260 TOKEN

310 — DETERMINE A CHECKSUM BASED ON A HASH OF NUMERIC USER INFORMATION (INPUT STRING)

320 — APPEND CHECKSUM TO INPUT

330 — PERFORM A FORMAT PRESERVING ENCRYPTION (FPE)

340 — CONVERT TO ALPHANUMERIC

350 — TOKEN

400

410 INPUT USER INFORMATION STRING OF A FIRST LENGTH AND A FIRST BASE

"1234"

420 HASH OF INPUT USER INFORMATION STRING

"1d6442ddcfd9db1ff81df77cbefcd5afcc8c7ca952ab3101ede17a8 4b866d3f3"

430 CONVERT INTO INTEGER VALUE

"1234567890"

440 CONVERT INTO CHECKSUM

"772"

450 COMBINE THE CHECKSUM AND THE INPUT STRING

"1234772"

460 PERFORM A FORMAT PRESERVING ENCRYPTION (FPE)

"4942999"

470 CONVERT TO APHABETIC STRING

"Kjtn"

480 TOKEN

TOKENIZATION WITH FORMAT PRESERVATION

BACKGROUND

Many services and platforms, such as banking-as-a-service (BaaS) platforms, software-as-a-service (SaaS) platforms, financial technology (FinTech) platforms, infrastructure-as-a-service (IaaS) platforms, and platform-as-a-service (PaaS) platforms, that support a wide variety of users and/or client devices, use tokenization as a means to secure sensitive user information. Conventional tokenization schemes used by such services and platforms utilize encryption to secure sensitive information. However, for a small number of digits (e.g., 10 or less), the token may be reverse-engineered and/or decrypted as a result of brute force and other nefarious activities.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

FIG. 2 shows an example method for tokenization, in accordance with aspects of this disclosure.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
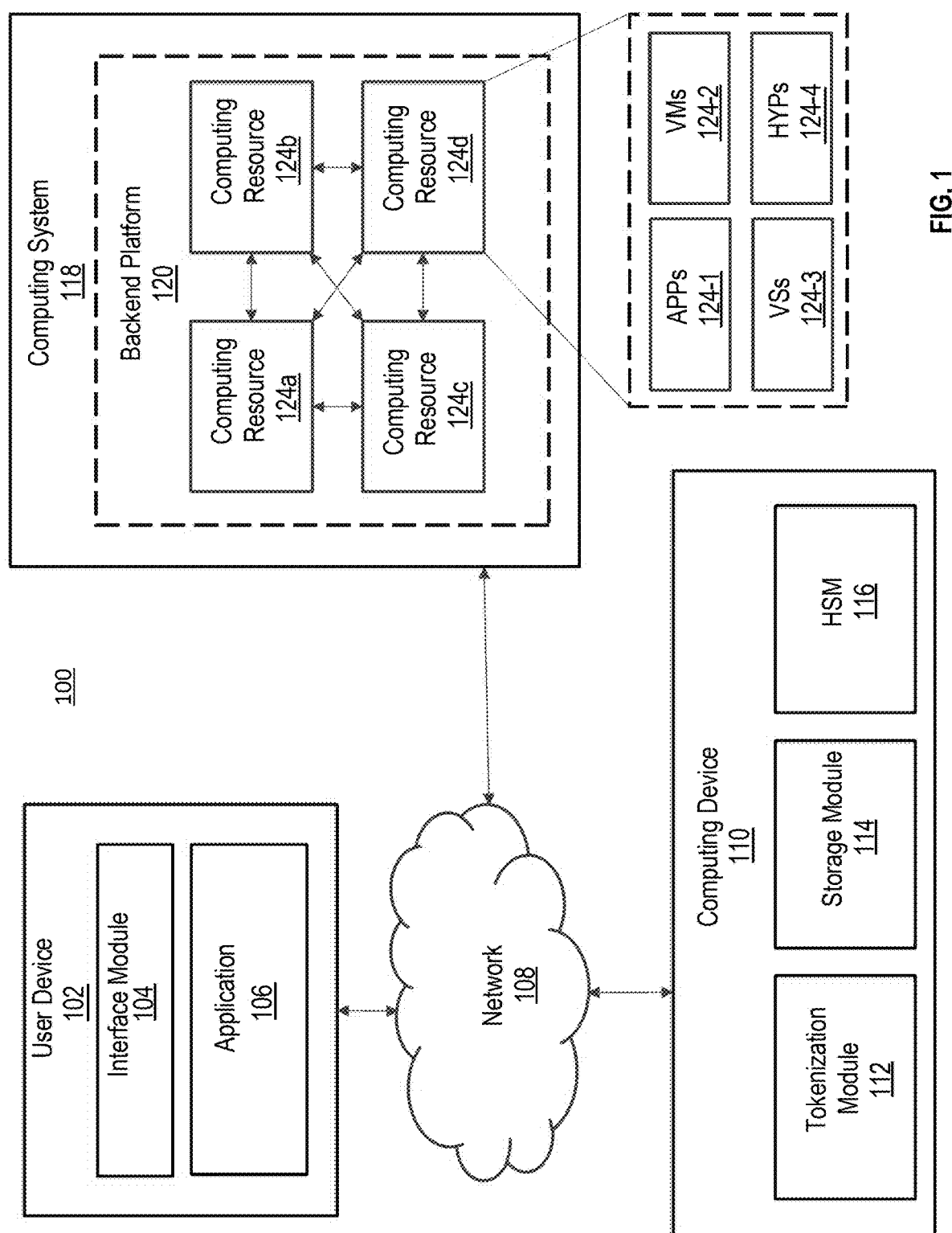
FIG. 1 is a block diagram of an example system for tokenization, in accordance with aspects of this disclosure.

A system and/or platform, such as a banking-as-a-service (BaaS) platform, a software-as-a-service (SaaS) platform, a financial technology (FinTech) platform, an infrastructure-as-a-service (IaaS) platform, a platform-as-a-service (PaaS) platform, and/or the like, may include, implement, and/or support tokenization to secure sensitive data/information. A secure token that cannot be reverse engineered with brute force may be generated and used to secure user information. A tokenization output according to the system, apparatus, device, method, computer program product embodiments, and/or combinations and sub-combinations thereof, as described herein, may be implemented by adding an additional string (e.g., additional digits) to an original input string of sensitive user information resulting in a string with larger length before encrypting to obfuscate a length of the original sensitive data that is to be tokenized. For example, short length strings of personal information, such as, credit card numbers (e.g., payment card information (PCI)), a social security number (SSN), such as the last four digits, a tax ID, a 10 digit NPI (National Provider Identifier) assigned to healthcare providers, a passport number, driver's license, IP address, or location, to name a few, may be easier to reverse-engineered or decrypt. In various embodiments, the system, apparatus, device, method, computer program product embodiments, and/or combinations and sub-combinations thereof, alters the original input string length and then may implement one or more numeric base changes to obfuscate the original input string length.

In various embodiments, a computing device may determine alphanumeric values based on numeric values generated from a hash of numeric user information of a first base. The hash of the user information may be combined with the user information in a second base, and, based on format-preserving encryption applied to the numeric user information, be converted to a third base, using an additive cipher information applied to numeric user information, and/or the like.

According to some aspects, a secure token may be algorithmically generated so that when detokenization is required, the secure token may be used to determine original user information without utilizing a tokenization vault as described in related U.S. application Ser. No. 17/901,575, filed Sep. 1, 2022, entitled "Vaultless Tokenization," and incorporated by reference in its entirety herein, to look up and/or identify sensitive information. According to some aspects, the system, method, and computer program product embodiments for vaultless tokenization may generate the secure token using multiple rounds of shuffling and lookup (e.g., via a secure table index) through a plurality of randomly generated tables (e.g., 10 M+pre-generated tables, etc.) that are encrypted and securely stored via a hardware service module (HSM) and/or the like. This method of shuffling and lookup results in a unique token that cannot be reversed engineered. According to some aspects, user information that has been shuffled through the plurality of randomly generated tables may be further secured through the application of mathematical operations (e.g., XOR, division, modulo, etc.), string operations (e.g., reverse, split, rotation, etc.) and/or an encryption algorithm. According to some aspects, the encryption algorithm may include, but is not limited to, length-preserving encryption (e.g., HCTR2, Block Cipher, etc.), format-preservice encryption (e.g., FF1, etc.), homomorphic encryption (e.g. BFV, CKKS, FHEW, etc.), and/or the like, using a user-specific derived key. According to some aspects, user information may be shuffled before encryption and reshuffled post encryption to generate a token. According to some aspects, metadata associated with the user information including, but not limited to, metadata describing character length, version number, field type, cyclic redundancy check (CRC) information, and/or the like may also be shuffled through the plurality of randomly generated tables and used to modify the token for additional randomness, security, and/or character-set frequency distribution. The shuffling process disclosed in U.S. application Ser. No. 17/901,575 may, in some aspects, be added to or be part of any of the tokenization processes described herein to further obfuscate the user's sensitive information.

Accordingly, the system, apparatus, device, method, computer program product embodiments, and/or combinations and sub-combinations thereof, for tokenization described herein can overcome challenges with conventional tokenization systems where sensitive user information is secured by mapping tokens to encrypted plain-text values representing the user information and storing the mappings in a database. The system, apparatus, device, method, computer program product embodiments, and/or combinations and sub-combinations thereof, for tokenization, described herein output a token (e.g., a secure token, etc.) that may not be reverse engineered and/or decrypted through brute force and other nefarious activities, hence providing improved security for the user information and the systems using the user information. In various embodiments described herein, the technology disclosed may mitigate limitations of encryption algorithms. For example, format preserving encryption (FPE) cannot process strings with length less than 3, so FEP 2-numeric string encryption is not possible without the instant processes.

FIG. 1 is a block diagram of an example system 100 for tokenization, according to some aspects of this disclosure. According to some aspects of this disclosure, system 100 may include and/or be a component of a business platform, a banking-as-a-service (BaaS) platform, a software-as-a-service (SaaS) platform, a financial technology (FinTech) platform, an infrastructure-as-a-service (IaaS) platform, a platform-as-a-service (PaaS) platform, and/or the like.

According to some aspects, system 100 may include a user device 102 (e.g., a mobile device, a smart device, a client device, a computer, an Internet-of-Things (IoT) device, a content access/reception device, etc.), a computing device 110 (e.g., a server, a cloud-computing device, a token management device, etc.), and a computing system 118 (e.g., a cloud-based computing system, a service system, a token management system, etc.) in communication via a network 108. Devices of and/or components of system 100 may be connected and/or in communication via wired connections, wireless connections, combinations thereof, and/or the like. According to some aspects, the computing device 110 may reside fully or partially on the computing system 118.

According to some aspects, the network 108 may include a packet-switched network (e.g., internet protocol-based network), a non-packet switched network (e.g., quadrature amplitude modulation-based network), and/or the like. The network 108 may include network adapters, switches, routers, modems, and the like connected through wireless links (e.g., radiofrequency, satellite) and/or physical links (e.g., fiber optic cable, coaxial cable, Ethernet cable, or a combination thereof). The network 108 may include public networks, private networks, wide area networks (e.g., Internet), local area networks, and/or the like. The network 108 may include a content access network, content distribution network, and/or the like. The network 108 may provide and/or support communication from telephone, cellular, modem, and/or other electronic devices to and throughout the system 100.

According to some aspects, the user device 102 may include an interface module 104. According to some aspects, the interface module 104 enables a user to interact with the user device 102, the network 108, the computing device 110, the computing system 118, and/or any other device/component of the system 100. The interface module 104 may include any interface for presenting and/or receiving information to/from a user. According to some aspects, the interface module 104 may include a web browser, a user interface, and/or the like.

According to some aspects, the interface module 104 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate data/information.

According to some aspects, user device 102 may include and/or be configured with application 106. Application 106 may include one or more application programming interfaces (APIs) that enable the user device 102 to access, view, communicate, and/or the like with devices/components of the system 100. For example, according to some aspects, the application 106 may support, facilitate, and/or be used as part of online transactions where a secure token (e.g., a secure token, etc.) may be generated to ensure the security of the online transactions. For example, online transactions may include the exchange of sensitive information (e.g., virtual card numbers generated in place of actual card numbers of a physical credit card, digital wallet information, user identification information, transaction-related information, and/or the like.

According to some aspects, the computing system 118 may be a cloud-based computing system and/or the like. The computing system 118 may support a variety of applications, devices, and/or services including, but not limited to banking-as-a-service (BaaS), software-as-a-service (SaaS), financial technology (FinTech) services, infrastructure-as-a-service (IaaS), platform-as-a-service (PaaS), and/or the like. The computing system 118 may include and/or be supported by a backend platform 120.

According to some aspects, the backend platform 120 may include a server or a group of servers. According to some aspects, the backend platform 120 may be hosted in a computing system 118. It may be appreciated that the backend platform 120 may not be cloud-based, or may be partially cloud-based. The computing device 110 may include one or more devices and/or components configured to interface with the backend platform 120.

According to some aspects, the computing system 118 may include an environment that delivers computing as a service, whereby shared resources, services, etc. may be provided to the backend platform 120. The computing system 118 may provide computation, software, data access, storage, and/or other services that do not require end-user knowledge of a physical location and configuration of a system and/or a device that delivers the services. According to some aspects, the computing system 118 may include computer resources 124 a-d.

According to some aspects, each computing resource 124 a-d may include one or more personal computers, workstations, computers, server devices, or other types of computation and/or communication devices. The computing resource(s) 124 a-d may host the backend platform 120. The cloud resources may include compute instances executing in the computing resources 124 a-d. The computing resources 124 a-d may communicate with other computing resources 124 a-d by wired connections, wireless connections, or a combination of wired or wireless connections.

Computing resources 124 a-d may include a group of cloud resources, such as one or more applications ("APPs") 124-1, one or more virtual machines ("VMs") 124-2, virtualized storage ("VS") 124-3, and one or more hypervisors ("HYPs") 124-4.

Application 124-1 may include one or more software applications (e.g., an instance of application 106, etc.) that may be provided to or accessed by the computing device 110 and/or the user device 102. Alternatively, the application 124-1 may eliminate the need to install and execute software applications on the user device 102. The application 124-1 may include software associated with backend platform 120 and/or any other software configured to be provided across the system 100. The application 124-1 may send/receive information from one or more other applications 124-1, by the virtual machine 124-2.

Virtual machine 124-2 may include a software implementation of a machine (e.g., a computer) that executes programs like a physical machine. Virtual machine 124-2 may be either a system virtual machine or a process virtual machine, depending upon the use and degree of correspondence to any real machine by virtual machine 124-2. A system virtual machine may provide a complete system platform that supports the execution of a complete operating system (OS). A process virtual machine may execute a single program and may support a single process. The virtual machine 124-2 may execute on behalf of a user and/or on behalf of one or more other backend platforms 225 and may manage the infrastructure of computing system 118, such as data management, synchronization, or long-duration data transfers.

Virtualized storage 124-3 may include one or more storage systems and/or one or more devices that use virtualization techniques within the storage systems or devices of computing resource 124 *a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 124-4 may provide hardware virtualization techniques that allow multiple operations systems (e.g., "guest operating systems") to execute concurrently on a host computer, such as computing resource 124 *a-d*. Hypervisor 124-4 may present a virtual operating platform to the guest operating systems and may manage the execution of the guest operating systems in multiple instances of a variety of operating systems and may share virtualized hardware resources.

According to some aspects, computing device 110 may support and/or facilitate the secure exchange of sensitive data/information between devices and/or components of the system 100. According to some aspects, computing device 110 may support and/or facilitate the secure exchange of sensitive data/information between devices and/or components of the system 100 by generating and processing tokens associated with sensitive information.

According to some aspects, computing device 110 may include a tokenization module 112. According to some aspects, the tokenization module 112 may provide, support, and/or facilitate tokenization services (e.g., tokenizing and detokenizing data, etc.) to securely communicate sensitive information to the computing system 118 and/or the like. Tokenization involves the substitution of sensitive information such as social security numbers, account numbers, and/or the like with a cryptographically generated replacement value or a token. According to some aspects, a request for tokenization may be included with a request from a device and/or application attempting to secure sensitive information, access a secure resource, and/or the like. According to some aspects, a tokenization request may include user objects such as user data/information (e.g., sensitive data) to be tokenized. According to some aspects, user data/information may include a username/password associated with a user account, a social security number, financial information, banking account information, authentication information to be used for verifying the identity of the user, and/or the like. According to some aspects, a token may enable access to the resource, for example, for a defined amount of time (e.g., during a communication session, etc.).

According to some aspects, the tokenization module 112 may authenticate and/or authorize any tokenization requests received (e.g., received via a web service, RESTful service, secure hypertext transfer protocol (HTTPS) uniform resource locator (URL) over transport layer security (TLS) protocol, etc.) from the user device 102 and/or the computing system 118.

According to some aspects, computing device 110 may generate secure tokens, for example, responsive to a tokenization request, which may be used to access electronically restricted resources (e.g., computing resources 124*a-d*, etc.) and/or access/enable resources, functions, and actions within specific applications and/or domains of the system 100. For example, according to some aspects, each computing resource 124 *a-d* may be associated with a different domain of a multi-domain application. For example, computing resource 124 *a* may be associated with an electronic banking domain, computing resource 124 *b* may be associated with a digital wallet and/or card management domain, computing resource 124 *c* may be associated with a financial technology-related domain, computing resource 124 *c* may be associated with a social networking domain, and/or the like. According to some aspects, each domain (e.g., computing resource 124 *a-d*, etc.) may be associated with a single sign-on (SSO) and/or a single logout (SLO) application/platform and a different secure token may be used to access the different domains. For example, the tokenization module 112 may generate tokens specified for a domain and/or security/token level. An indicated domain for a token may be a domain of a multi-domain application and/or the like to which a secure token is used to enable access. The security/token level may be an indication of resources, functions, and actions available to the user device 102 within a domain, for a computing resource, and/or backend platform component for which a secure token is prepared.

According to some aspects, computing device 110 may include storage module 114. Storage module 114 may include physical storage, virtual storage, local storage, and/or remote storage mediums. According to some aspects, storage module 114 may store user objects associated with users (e.g., a user of the user device 102, etc.) such as sensitive data (e.g., credit card numbers, account numbers, personal information). According to some aspects, the storage module 114 may store user objects in a hashed form, an encrypted form, and/or an encrypted hashed form.

According to some aspects, storage module 114 may store data/information used for tokenization. According to some aspects, storage module 114 may store data/information used to generate secure tokens including, but not limited to, a plurality of randomly generated tables (e.g., alphabetic tables, numeric tables, alphanumeric tables, etc.). According to some aspects, storage module 114 may store key-value pairs and/or related information (e.g., various data structures, hashes, access control lists, data sets, token definitions, etc.).

According to some aspects, computing device 110 may include and/or be in communication with a hardware security module (HSM) 116. According to some aspects, HSM 114 may generate, store, and/or provide encryption keys (and/or secrets, hash keys, etc.) to the computing device 110.

According to some aspects, may store any additional data/information (e.g., starting variables used for token generation, token parameters, secret keys, etc.) used by the tokenization module 112 for tokenization. For example, the HSM 116 may store generate, store, and/or provide indications of unique keys, hashing algorithms, salt values, iteration counts, token layouts, a token types (e.g., alphanumeric, numeric, alphabetic, string, etc.), replacement values, padding values, token scopes, format, and/or the like. According to some aspects, computing device 110 may communicate with the HSM 116 as a dedicated module and/or partition for tokenization and/or encryption services. According to some aspects, computing device 110 may communicate with the HSM 116 to access, retrieve, and/or receive encryption keys and/or any other data/information needed for tokenization and/or encryption at runtime.

According to some aspects, computing device 110 (e.g., tokenization module 112) may initiate a tokenization process by controlling a number of digits with one or more base changes, such that a nefarious actor attempting to decipher and/or reverse engineer the token generated will be unable to discern which characters, values, symbols, numbers, and/or the like of the token represent the original data/information and which characters, values, symbols, numbers, and/or the like.

According to some aspects, additional metadata (e.g., metadata indicative of and/or describing user data/information length, version number, field type, CRC, etc.) may be added to a user input string to further secure any generated token via data padding, appending, prepending, token modification, and/or the like. For example, the additional metadata may be added to portions of a generated token. A nefarious actor attempting to decipher and/or reverse engineer a token generated as described herein will be unable to discern which characters, values, symbols, numbers, and/or the like of the token represent the original data/information and which characters, values, symbols, numbers, and/or the like have been added to the cryptographic form of the original data/information via data padding, appending, prepending, token modification, and/or the like.

According to some aspects, the tokenization module 112 may generate encryption keys that may be used when implementing the tokenization related processes. According to some aspects, an encryption key may be generated for each user device (e.g., the user device 102, etc.) of the system 100, for example, during a user/client onboarding process and/or the like. For example, system 100 may include any number of user devices, and each user device (e.g., the user device 102, etc.) may be associated with an identifier (e.g., a customer identifier, a user identifier, a device identifier, etc.). The tokenization module 112 may generate a data encryption key, a hash function key (e.g., HMAC/hash key, etc.) to generate a CRC, and an initialization vector (IV) (e.g., a starting variable (SV), etc.) based on an identifier of a user device and encrypt such using KEK. According to some aspects, the tokenization module 112 may use any encryption technique.

According to some aspects, computing device 110 may generate one or more pre-configured secrets (e.g., secret information, passwords, credentials, secret key, etc.), input value characters (numbers, characters, symbols, etc.), and match operations (e.g., HMAC, etc.). According to some aspects, the computing device 110 may also generate increment values from one or more pre-configured secrets, the input value characters (numbers, characters, symbols, etc.), and match operations (e.g., HMAC, etc.).

According to some aspects, in a scenario where a nefarious actor gets access to a token generated by the computing device 110, the nefarious actor would still be unable to reverse engineer any token generated according to the system, apparatus, device, method, computer program product embodiments, and/or combinations and sub-combinations thereof, for tokenization described herein. For example, the nefarious actor would lack the necessary encryption keys, hashing keys, and other secret values stored by the HSM 116. Additionally, the nefarious actor would be unaware of the logic to derive any runtime values from the encryption keys, hashing keys, and other secret values stored by the HSM 116 and replicate the exact numeric base changes of the plurality of tokenization steps used by computing device 110.

According to some aspects, computing device 110 may generate a token based on a tokenization process. According to some aspects, a process for token generation described below may be used for generating a secure token that may not be reverse engineered, for example, via brute force and/or the like. According to some aspects, the process for token generation is provided as an example. The system, apparatus, device, method, and/or computer program product embodiments, and/or combinations and sub-combinations thereof for tokenization are not limited to this process of token generation and other steps may be used in accordance with aspects described herein.

According to some aspects, computing device 110 (tokenization module 112) may detokenize the tokenized user data/information to determine, identify, and/or access the original user data/information. According to some aspects, the tokenization module 12 may use base conversions, in the reverse of the token generation and modification processes to detokenize any generated token.

FIG. 2 shows an example computer-implemented method 200 for tokenization, according to some aspects of this disclosure. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 2, as will be understood by a person of ordinary skill in the art. Method 200 shall be described with regard to elements of FIG. 1. However, method 200 is not limited to the specific aspects depicted in FIG. 1 and other systems can be used to perform the method as will be understood by those skilled in the art.

The following tokenization embodiment will be described at a high level for a series of numeric base systems. A more detailed non-limiting example is provided in FIG. 4. A numeric base system, or radix, determines a number of unique digits (including zero) that a system uses to represent numbers. Common bases include, but are not limited to, Base-10 (Decimal) that uses digits 0-9; Base-2 (Binary) that uses digits 0 and 1, typically fundamental to computers; Base-8 (Octal) that uses digits 0-7; Base-16 (Hexadecimal) that uses digits 0-9 and letters A-F, or Base 62 that is a binary-to-text encoding scheme that represents binary data using 62 printable ASCII characters (A-Z, a-z, 0-9). However, other bases may be implemented without departing from the scope of the technology disclosed herein. In a positional number system, each digit's position represents a power of the base. For example, in Base-10, the number 123 represents $(1*10^2)+(2*10^1)+(3*10^0)$. In Base-2 (binary), 101 represents $(1*2^2)+(0*2^1)+(1*2^0)=4+0+1=5$ in base- 10, and in Base-16 (hexadecimal), 2A represents (2*16^1)+ (10*16^0)=32+10=42, and the like. In various embodiments described herein, different bases may be selected to represent one or more strings of digits. In some embodiments, a string can include a sequence of individual units, where a unit can be a number, a character, or any other unit can be input from a computer input device or generated by a computing device. A base of a string is the number of different units allowed in any position of the string. Hence, a base of a string can also be referred to as a numeric base. A string including lower case characters in English can have a base of 26 English alphabet characters. A string including both lower case and upper case characters in English can have a base of 52 characters in both lower and upper cases. An alphanumeric string can include the 10 numerals, 26 lower case characters in English, and 26 upper case corresponding characters, resulting in a base of 62. In some embodiments, a string can further include special characters, such as "@", "$", and so on, which can lead to a larger base. In some embodiments, a string can include any character from other language, such as French, German, Russian, Chinese, Japanese, Korean, or any other language, which will result in a different base for the string. Embodiments herein can be applicable to any string with different bases as discussed below. In some embodiments, a string can be a numeric string that is a part of a social security number or a credit card number.

In 210, a computing device 110 determines a length of a user input string and assigns a first numeric base. According to some aspects, computing device 110 may determine the length and the first numeric base values responsive to a request for tokenization (e.g., to generate a token, etc.). Tokenization involves the substitution of sensitive information such as social security numbers, account numbers, and/or the like with a cryptographically generated replacement value or a token. According to some aspects, a token may enable access to the resource, for example, for a defined amount of time. Determining the alphanumeric values may be performed at the start of a tokenization process.

In 220, computing device 110 determines a security algorithm and generates a security string of a second length of a second base. In some embodiments, the security string can be generated by a hashing algorithm selected from a set of secure hash algorithms (SHA) including MD5, SHA-1, SHA-2, SHA-3, or any other security algorithms. According to some aspects, the numeric user information (with or without a pre-configured secret cryptographic key) may be hashed according to a hashing function to output hashed numeric information. For example, a hash of the numeric user information string may be converted into an integer number (e.g., of base 10). This integer number may be converted into a security string. A security algorithm (like MD5, SHA-1, or SHA-256) processes the data and produces a fixed-size string or number. In some embodiments, the security algorithm and the security information used in generating the security string can be agreed upon by user device 102 and computing device 110 ahead of performing method 200. In some embodiments, computing device 110 can store the security algorithm and the security information used in generating the security string, and further inform user device 102 about such information for detokenization of a token received from computing device 110. Therefore, such security string cannot be performed in someone's mind alone without using a computing storage device to store the needed security algorithm and the security information and further communicate with another user device to transmit such information.

According to some aspects, the hashed numeric user information may be encrypted to output the numeric values. According to some aspects, additive cipher applications and/or information may be used to modify the hashed values of the numeric user information.

In 230, computing device 110 combines the security string and the input string into a third string of a third length and a third base, where the third length is a sum of the first length and the second length. Alternatively, or in addition to, the input length may be added as remaining digits in the third string. In some embodiments, the third length can be larger than the sum of the first length and the second length so that additional information can be included into the third string. In some embodiments, the third string can be generated by combining the security string and the input string, e.g., appending the security string at an end or a beginning of the input string. In some embodiments, the third string can be generated by shuffling or interleaving the input string and the security string in a predetermined manner.

In 240, computing device 110 performs a format preserving encryption (FPE) on the third string of the third length of the third base to generate a fourth string of the third length of the third base. Format-preserving encryption (FPE) is a cryptographic technique that encrypts data while preserving its original format (e.g., length, numerals, alphanumeric, alphabetic, spacing, punctuation, etc.), allowing encrypted data to be used in systems that expect the original format, like credit card numbers or social security numbers. By performing the encryption operation on a larger (third length) string, instead of the first input length, the system increases the strength of the encryption and obfuscates the original length. In some embodiments, performing the FPE on the third string of the third length can include performing the FPE by an n-bit block cipher, an Advanced Encryption Standard (AES) algorithm, a Feistel network, an algorithm defined by FF1 standard or FF3 standard, or any other FPE algorithms.

In 250, computing device converts the fourth string of the third length of the third base into a fifth string of the first length of a fourth base for the input string of the first length and the first base. For example, the fourth string is converted into an alphabetic string of Base-62 to generate token 260. While described for Base-62, other bases such as base 64, base 52, or even an artificially defined base may defined without departing from the scope of the technology disclosed herein. In this example, the fourth base is larger than the first base, and the fourth string of the third length of the third base can be reduced in length to result in the fifth string of the first length with the fourth base. Accordingly, operations performed herein are not just any combination of encryption or numerical operations. Instead, it is a specific operation sequence performed on the input string and the security string that are combined to generate the third string, the fourth string generated by FPE operations on the third string, and the fifth string. Such specific operation sequence can increase the security for the tokenization of the input string. Such operations are particularly useful when the input string is of a small length, such as 3 bits of a credit card security code, or 4 bits of a social security number. Similarly, the operation sequence disclosed here can also increase the security for tokenization of input strings with larger length. The fifth string generated by method 200 is different from directly applying a FPE algorithm or operations to the input string. Accordingly, the operation sequence disclosed herein as described in steps 210-250 are different from a direct application of a FPE algorithm on an input string. In some embodiments, there can be various relationships between the first base, the second base, the third base, and the fourth base. In some embodiments, the first base, the second base, the third base, and the fourth base can be independent from each other, and can be chosen based on the needs of the intended application. In some embodiments, the third base can be larger than or equal to a maximal base of the first base and the second base, which is a maximum value of the first base and the second base. In some embodiments, a maximal base of the first base and the second base can be the first base when the first base is larger than or equal to the second base, otherwise the maximal base can be the second base, which is larger than the first base. In some embodiments, the fourth base can be larger than the first base. In some embodiments, the input string can be binary string (first base=2), while the security string, which can be a hash/checksum string, can be a numeric string (second base=10). The maximal base is 10 in this case. The third string can be obtained by combining the input string and the security string, which can be an alphanumeric string (third base=62). In some embodiments, the input string can be an email string (first base=82) while the fourth string can be an alphanumeric string (base=62). There can be many other embodiments, examples, and implementations of method 200.

According to some aspects of this disclosure, the method 200 may further include computing device 110 padding the token with one or more randomly generated numeric characters.

According to some aspects, computing device 110 may determine an alphabetic value indicative of the amount of numeric characters of the numeric user information and may append the alphabetic value to the token.

According to some aspects of this disclosure, the method 200 may further include computing device 110 sending the token to a user device associated with the numeric user information, a storage medium, an application, and/or the like to facilitate access to a resource and/or the like.

Figure 3:
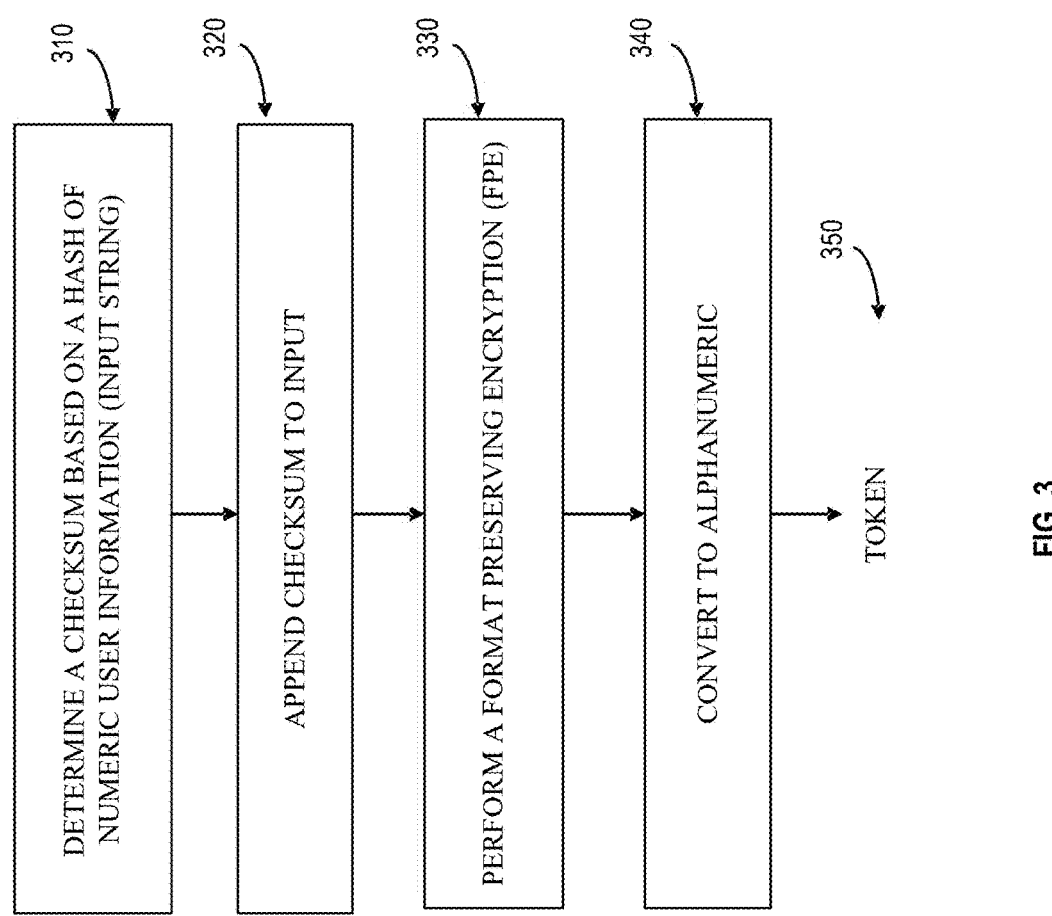
FIG. 3 shows an example method for tokenization, in accordance with aspects of this disclosure.

FIG. 3 shows an example computer-implemented method 300 for tokenization, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 3, as will be understood by a person of ordinary skill in the art. Method 300 shall be described with regard to elements of FIG. 1. However, method 300 is not limited to the specific aspects depicted in FIG. 1 and other systems can be used to perform the method as will be understood by those skilled in the art.

The following tokenization embodiment will be described at a high level for a plurality of strings of various bases and a security string implemented with a checksum appended to add length (fixed or variable) to a user data input string. However, other types of security strings or metadata may be generated and appended to the user data input string. For example, a length of the user data input string (e.g., number of digits), an expiry date, expiry time, version number, encoded data, data type, or algorithmic generated data strings, to name a few, may be embedded into the token. Appending may be implemented by adding, XORing (exclusive OR), algorithmic generation, or by hashing, to name a few. Once the original user data string has been increased in length by the embedding, the numeric base may be altered in one or more processing steps as will be described in greater detail herein. In addition, the length included in the security string can aid the integrity check of the input string, in addition to increasing the security.

In 310, a computing device 110 determines a length of a user input string and assigns a first numeric base. According to some aspects, computing device 110 may determine the length and the first numeric base values responsive to a request for tokenization (e.g., to generate a token, etc.). Tokenization involves the substitution of sensitive information such as social security numbers, account numbers, and/or the like with a cryptographically generated replacement value or a token. According to some aspects, a token may enable access to the resource, for example, for a defined amount of time. Determining the alphanumeric values may be performed at the start of a tokenization process.

In 320, computing device 110 determines a security algorithm and generates a security string (e.g., second string) of a second length of a second base. For example, a hash of the numeric user information string may be converted into an integer number (e.g., of base 10). This integer number may be converted into a security string, such as a checksum. A checksum is a value, often a string of numbers and letters, derived from a data set (like a file or message) used to verify its integrity and detect errors or alterations. It acts as a digital fingerprint, allowing the system to confirm if a file or data has been corrupted or tampered with. A checksum algorithm (like MD5, SHA-1, or SHA-256) processes the data and produces a fixed-size string or number. Checksums help ensure that data remains unchanged during transmission, storage, or copying. For example, if a checksum of a file or data doesn't match the original checksum, it indicates a potential error or corruption. Computing device 110 combines the security string (e.g., checksum) and the input string into a third string of a third length of a third base, wherein the third length is a sum of the first length and the second length. Alternatively, or in addition to, the input length may be added as remaining digits in the third string.

In 330, computing device 110 performs a format preserving encryption (FPE) on the third string of the third length of the third base to generate a fourth string of the third length of the third base. Format-preserving encryption (FPE) is a cryptographic technique that encrypts data while preserving its original format (e.g., length, numerals, alphanumeric, alphabetic, spacing, punctuation, etc.), allowing encrypted data to be used in systems that expect the original format, like credit card numbers or social security numbers. By performing the encryption operation on a larger (third length) string, instead of the first input length, the system increases the strength of the encryption and obfuscates the original length.

In 340, computing device converts the fourth string of the third length of the third base into a fifth string of the first length of a fourth base (for an input string of a first length. For example, the fourth string is converted into an alphabetic string of Base-62 to generate token 350.

According to some aspects of this disclosure, the method 300 may further include computing device 110 sending the token to a user device associated with the numeric user information, a storage medium, an application, and/or the like to facilitate access to a resource and/or the like.

Figure 4:
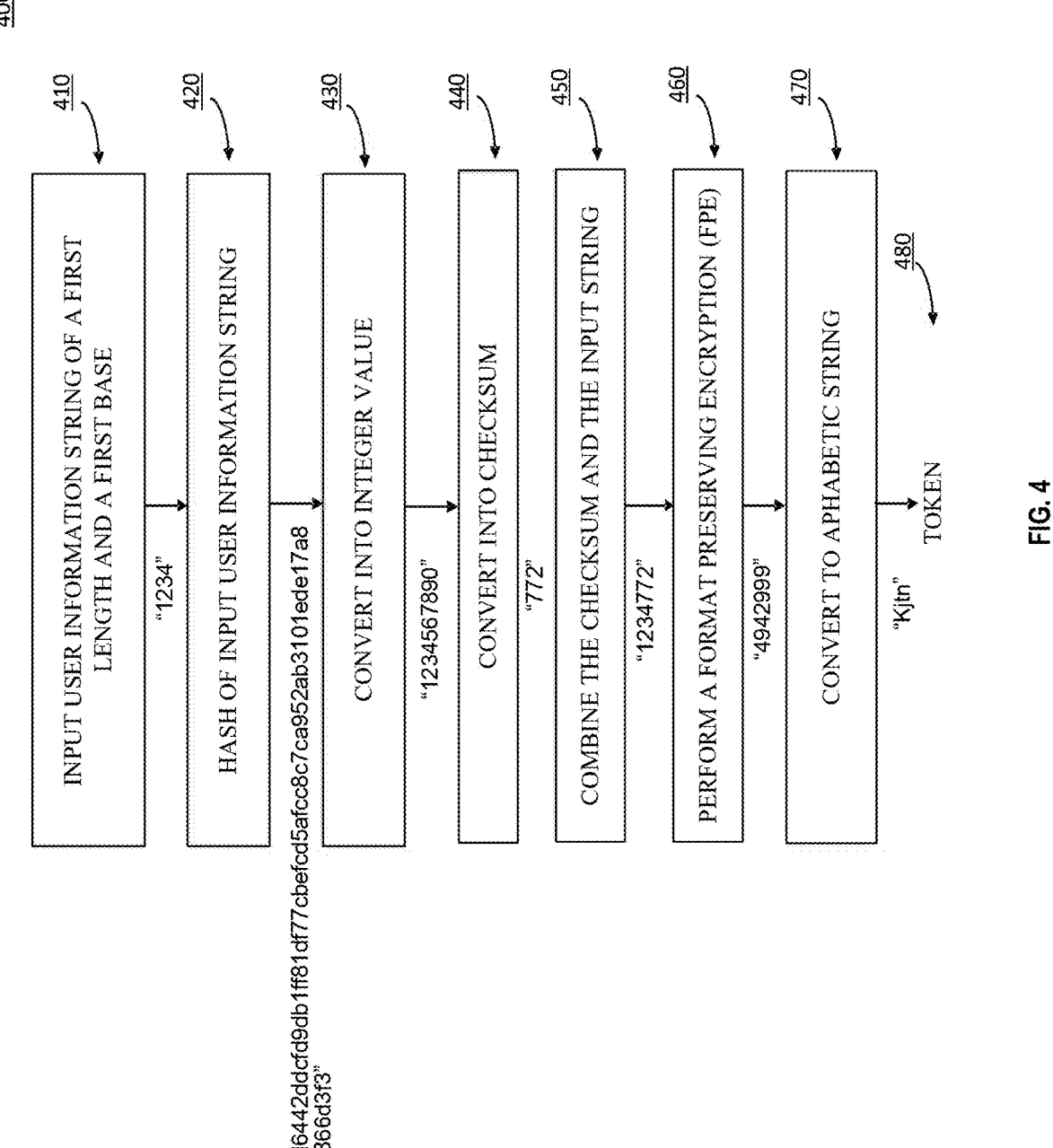
FIG. 4 shows an example method for tokenization, in accordance with aspects of this disclosure.

FIG. 4 shows an example computer-implemented method 400 for tokenization, according to some aspects of this disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 4, as will be understood by a person of ordinary skill in the art. Method 400 shall be described with regard to elements of FIG. 1. However, method 400 is not limited to the specific aspects depicted in FIG. 1 and other systems can be used to perform the method as will be understood by those skilled in the art.

A non-tokenization example is described below. However, any type of user information, string length, security string, base system, or alphanumeric output token type may be substituted without departing from the scope of the technology described herein.

Tokenize Example

In 410, computing device receives user information as an input string of determinable first length and a first base, shown as "1234." Accordingly, input string "1234" is a string of base 10, which is a numeric string with base 10 including "0, 1, . . . 9" as its 10 units of the string. The length of string "1234" is 4.

In 420, computing device takes a hash, for example, SHA3 of 1234 SHA3-256 (1234, ALT)= "1d6442ddcfd9db1ff81df77cbefcd5afcc8c7ca952ab3101ede 17a84b866d3f3."

In 430, computing device converts the hash into an integer value: hash2Int(1d6442ddcfd9db1ff81df77cbefcd5afcc8c7 ca952ab3101ede17a84b866d3f3)="1234567890."

In 440, computing device converts the hash integer value into a checksum. 1234567890=772. Optionally, in one alternative aspect, the computing device may add the input length, e.g., 4 in this value, as remaining bits. Operations performed at 420, 430, and 440 can be examples of operations performed for step 220 of method 200. The string "772" is an example of a security string, which is of base 10 in this example.

In 450, the computing device appends the checksum to the input user information string, where "1234"+ "772"="1234772". Optionally, in one alternative aspect, the computing device may take combinations of the hash integer value characters (e.g., first/middle/combination) in the integer value "1234567890" for addition to the input user information string, instead of, or in addition to the checksum. For example, the computing device may select the last two characters "90" and, in this aspect, the combined string may be "1234"+"90"="123490." Operations performed at 450 can be examples of operations performed for step 230 of method 200. The string "1234772" is an example of the third string by appending the security string "772" at the end of input string "1234." There can be other ways to combine the security string and the input string, and there can be other security strings, not shown. In this example, compared to the input string "1234", the combined third string "1234772" has a larger length of 7, which is larger than the length 4 of the input string "1234." With the increased length from 4 to 7, the security level can be increased as well. In 460, the computing device performs a FPE operation. In this example, the system is performing FPE FF1 on a 7 digit input instead of 4 digits, which increases an encryption strength significantly. As shown, FF1_encrypt(1234772, 10 rounds)="4942999." Operations performed at 460 can be examples of operations performed for step 240 of method 200. The result string "4942999" obtained after performing the FPE operation is an example of the fourth string. Since the operation is a FPE operation, the fourth string has the same length and base as the third length and the third base for the third string. In 470, the computing device converts the FPE output string into an alphabetic string, base62_encode(4942999), to produce output token 480 of "Kjtn". While the output token, in this aspect, matches the input string length, the base system changes obfuscates the original data by embedding additional digits before encryption. Alternatively, in some aspects, the output string length may be altered from the input user information string length (e.g., increased or decreased) to further obfuscate or to align with a specific desired tokenization length. Accordingly, token 480 of "Kjtn" is an example of the fifth string obtained by converting the fourth string 4942999 of base 10 into a string of base 62 of an alphanumeric string. With the increased base, a string of length 7 can be decreased to length 4 of base 62, which is the same length of the input string "1234." In some embodiments, the selection of the base for the fifth string can be big enough to ensure a string of the third length can be completely encoded by a string of the first length in the base selected for the fifth string. For example, the base 62 is big enough so that all strings of length 7 and base 10 can be encoded into a string of length 4 of base 62. Strings of other base and length can be applicable as well. In some embodiments, base 62 for an alphanumeric string is for a string based on English. For other language, the base for an alphanumeric string can vary accordingly.

According to some aspects of this disclosure, the method 400 may further include computing device 110 sending the token to a user device associated with the numeric user information, a storage medium, an application, and/or the like to facilitate access to a resource and/or the like.

Figure 5:
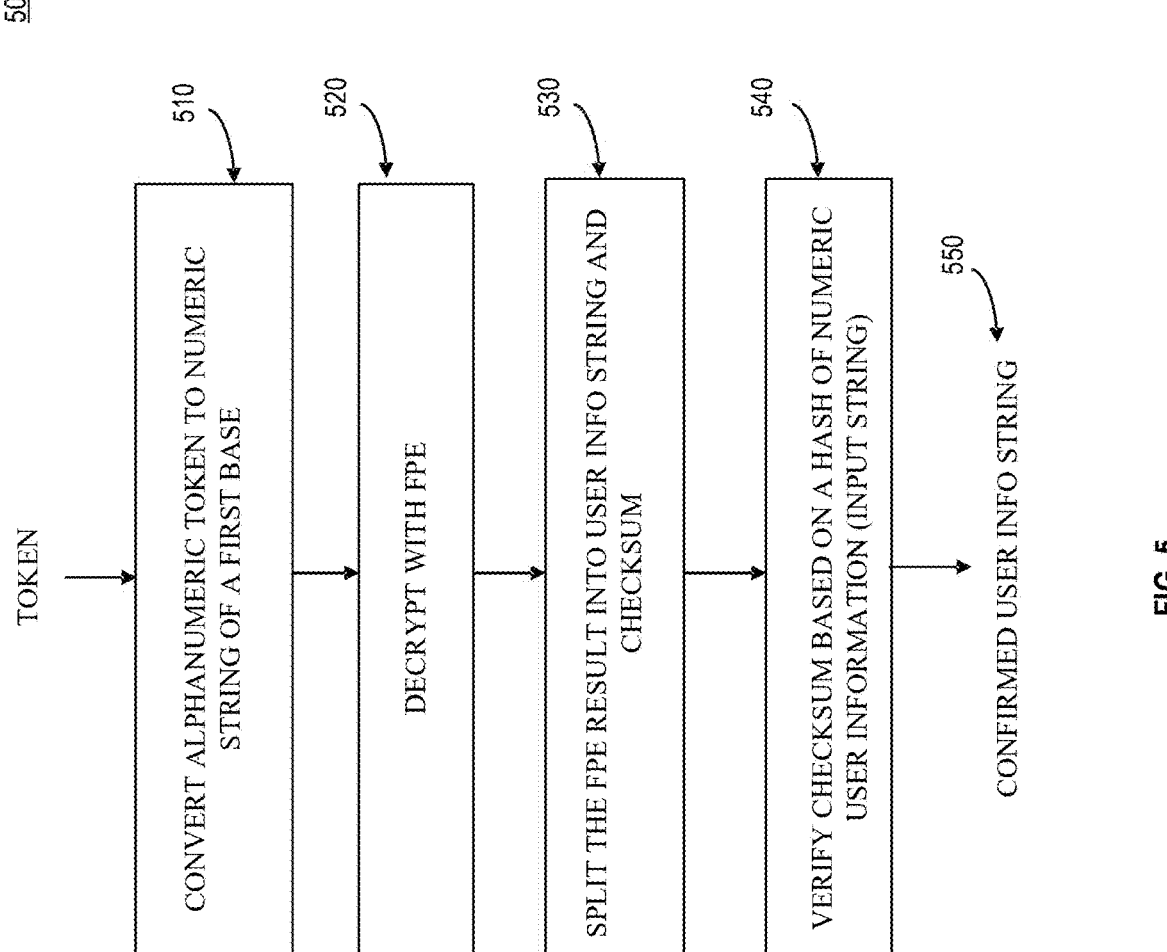
FIG. 5 shows an example method for detokenization, in accordance with aspects of this disclosure.

FIG. 5 shows an example computer-implemented method 500 for detokenization, according to some aspects of this disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 5, as will be understood by a person of ordinary skill in the art. Method 500 shall be described with regard to elements of FIG. 1. However, method 500 is not limited to the specific aspects depicted in FIG. 1 and other systems can be used to perform the method as will be understood by those skilled in the art.

The following detokenization embodiment will be described at a high level for a series of numeric base systems and a checksum originally appended to add length to the input string before encryption.

In 510, based on the encryption key, computing device converts an input token (e.g., token 260), into a second string of a second length and second base. For example, the token is converted from an alphabetic string of Base-62. Encryption keys are generated using algorithms that produce a sequence of bits, which then act as a code to encrypt and decrypt data. These keys may include the bases used to generate the token and be subsequently used to detokenize the token into the original user input string 550.

In 520, computing device 110 decrypts the second string with a format preserving decryption (FPE) to generate an FPE decryption output string.

In 530, computing device 110 splits the FPE decryption output string into a user information string and a checksum. Checksums help ensure that data remains unchanged during transmission, storage, or copying. For example, if a checksum of a file or data doesn't match the original checksum, it indicates a potential error or corruption. Alternatively, or in addition to, the input length may be removed as remaining digits.

In 540, computing device 110 verifies the checksum based on a hash of the numeric user information and outputs the confirmed user input string. According to some aspects, the numeric user information (with or without a pre-configured secret cryptographic key) may have been previously hashed according to a hashing function to output hashed numeric information. According to some aspects, the hashed numeric user information may be encrypted to output the numeric values. For example, according to some aspects, additive cipher applications and/or information may be used to modify the hashed values of the numeric user information.

According to some aspects of this disclosure, the method 500 may further include computing device 110 sending the user information to a user device associated with the numeric user information, a storage medium, an application, and/or the like to facilitate access to a resource and/or the like.

Figure 6:
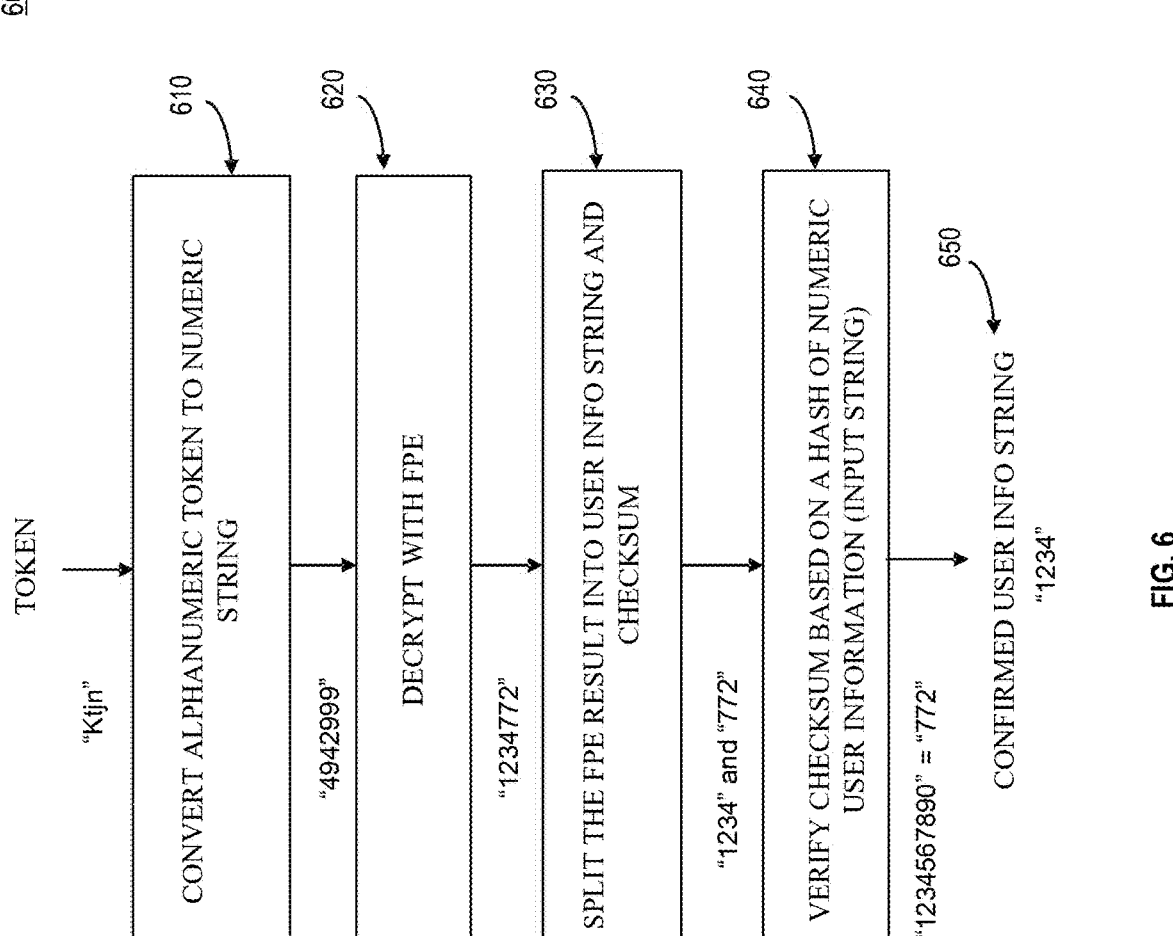
FIG. 6 shows an example method for detokenization, in accordance with aspects of this disclosure.

FIG. 6 shows an example computer-implemented method 600 for detokenization, according to some aspects of this disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 6, as will be understood by a person of ordinary skill in the art. Method 600 shall be described with regard to elements of FIG. 1. However, method 600 is not limited to the specific aspects depicted in FIG. 1 and other systems can be used to perform the method as will be understood by those skilled in the art.

A non-limiting detokenization example is described below. However, any type of user information, string length, security string, base system, or alphanumeric output token type may be substituted without departing from the scope of the technology described herein.

Detokenize Token Example

In 610, computing device converts an input token "Kjtn" (e.g., token 480) from an alphabetic string to a numeric second string: Base62_decode (Kjtn)="4942999."

In 620, computing device 110 decrypts the numeric second string "4942999" with a format preserving decryption (FPE) algorithm to a third string of "1234772".

In 630, computing device 110 splits the FPE result into a user information string "1234" and a checksum "772". Alternatively, or in addition to, the input length may be removed as remaining digits.

In 640, computing device 110 verifies the checksum based on a hash of the numeric user information and outputs the confirmed user input string.

a. hash2Int(SHA3-256("1234", SALT")): 1234567890 b. Integer to checksum value: 1234567890=772

In 650, user info string "1234" is confirmed.

According to some aspects of this disclosure, the method 600 may further include computing device 110 sending the user information to a user device associated with the numeric user information, a storage medium, an application, and/or the like to facilitate access to a resource and/or the like.

Figure 7:
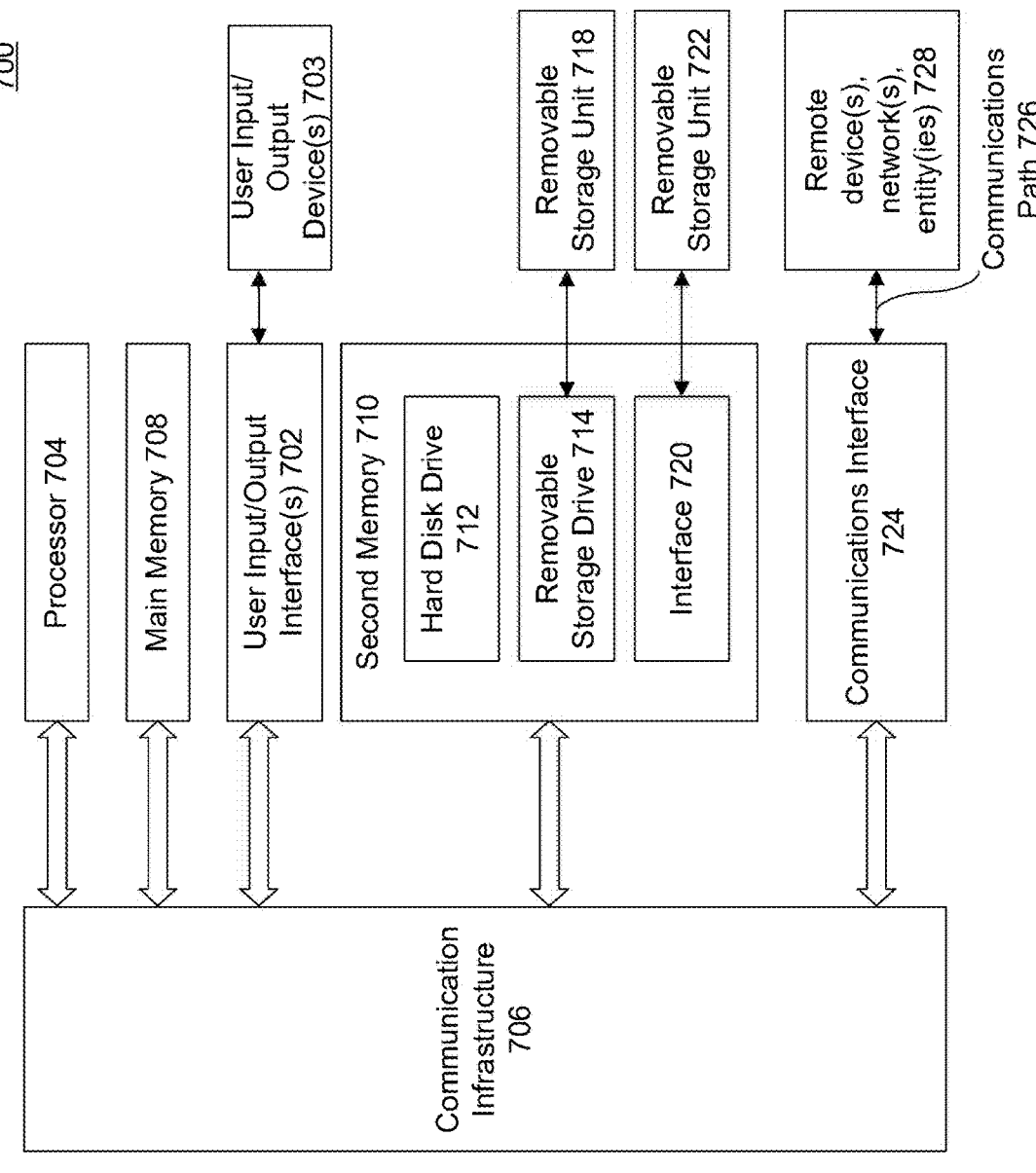
FIG. 7 is an example computer system useful for implementing various aspects disclosed herein.

Various aspects of this disclosure can be implemented, for example, using one or more computer systems, such as computer system 700 shown in FIG. 7. Any device and/or component described herein may be and/or include the computing system 700. Computer system 700 can be used, for example, to implement any method (e.g., the method 200, method 300, method 400, method 500, and method 600, etc.) described herein. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure 706 (a bus, etc.).

One or more processors 704 can each be a graphics processing unit (GPU). According to some aspects, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 707, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (e.g., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

According to some aspects, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method comprising:

tokenizing an input string of sensitive information, the tokenizing obscuring the sensitive information, the tokenizing comprising:

generating, using a security algorithm and security info, a security string of a second length of a second base for the input string of a first length of a first base;

combining the security string and the input string into a third string of a third length of a third base, wherein the third length is a sum of the first length and the second length;

performing a format preserving encryption (FPE) on the third string of the third length of the third base to generate a fourth string of the third length of the third base; and converting the fourth string of the third length of the third base into a fifth string of the first length of a fourth base for the input string of the first length and the first base, wherein the fifth string comprises a token of the input string of sensitive information; and communicating the token to a banking domain computing system over a communication channel.

2. The computer-implemented method of claim 1, wherein the input string comprises a numeric string with the first base of 10, and the fifth string comprises an alphanumeric string of the fourth base of 62 or 52.

3. The computer-implemented method of claim 1, wherein the input string comprises a numeric string that is a part of a social security number or a credit card number.

4. The computer-implemented method of claim 1, wherein the security string of the second length of the second base comprises any of: a checksum, one or more characters of the checksum, metadata, a character length of the input string, a version number, a field type, or cyclic redundancy check (CRC) information.

5. The computer-implemented method of claim 1, wherein the second base is selected from any of: a numeric base of 10, an alphanumeric base of 62 or 52, or a base larger than 62 comprising numerals, alphabet characters, and special characters.

6. The computer-implemented method of claim 1, wherein the security string is generated by a hashing algorithm selected from a set of secure hash algorithms (SHA) comprising any of: MD5, SHA-1, SHA-2, and SHA-3.

7. The computer-implemented method of claim 1, wherein the combining the security string and the input string into the third string comprises appending the security string at an end or a beginning of the input string.

8. The computer-implemented method of claim 1, wherein the performing the FPE on the third string of the third length comprises performing the FPE by an n-bit block cipher, an Advanced Encryption Standard (AES) algorithm, a Feistel network, or an algorithm defined by a FF1 standard or a FF3 standard.

9. A non-transitory computer-readable medium having instructions stored thereon that, when executed by at least one computing device, cause the at least one computing device to perform operations comprising:

tokenizing an input string of sensitive information, the tokenizing obscuring the sensitive information, the tokenizing comprising:

generating, using a security algorithm and security info, a security string of a second length of a second base for the input string of a first length of a first base;

combining the security string and the input string into a third string of a third length of a third base, wherein the third length is a sum of the first length and the second length;

performing a format preserving encryption (FPE) on the third string of the third length of the third base to generate a fourth string of the third length of the third base; and converting the fourth string of the third length of the third base into a fifth string of the first length of a fourth base for the input string of the first length and the first base, wherein the fifth string comprises a token of the input string of sensitive information; and communicating the token to a banking domain computing system over a communication channel.

10. The non-transitory computer-readable medium of claim 9, wherein the input string comprises a numeric string with the first base of 10, the fifth string comprises an alphanumeric string of the fourth base of 62 or 52.

11. The non-transitory computer-readable medium of claim 9, wherein the security string of the second length of the second base comprises any of: a checksum, one or more characters of the checksum, metadata, a character length of the input string, a version number, a field type, or cyclic redundancy check (CRC) information.

12. The non-transitory computer-readable medium of claim 9, wherein the second base is selected from any of: a numeric base of 10, an alphanumeric base of 62 or 52, or a base larger than 62 comprising numerals, alphabet characters, and special characters.

13. The non-transitory computer-readable medium of claim 9, wherein the security string is generated by a hashing algorithm selected from a set of secure hash algorithms (SHA) comprising any of: MD5, SHA-1, SHA-2, and SHA-3.

14. The non-transitory computer-readable medium of claim 9, wherein the performing the FPE on the third string of the third length comprises performing the FPE by an n-bit block cipher, an Advanced Encryption Standard (AES) algorithm, a Feistel network, or an algorithm defined by a FF1 standard or a FF3 standard.

15. A system comprising:

a memory; and at least one processor coupled to the memory and configured to perform operations comprising:

tokenizing an input string of sensitive information, the tokenizing obscuring the sensitive information, the tokenizing comprising:

generating, using a security algorithm and security info, a security string of a second length of a second base for the input string of a first length of a first base;

combining the security string and the input string into a third string of a third length of a third base, wherein the third length is a sum of the first length and the second length;

performing a format preserving encryption (FPE) on the third string of the third length of the third base to generate a fourth string of the third length of the third base; and converting the fourth string of the third length of the third base into a fifth string of the first length of a fourth base for the input string of the first length and the first base, wherein the fifth string comprises a token of the input string of sensitive information; and communicating the token to a banking domain computing system over a communication channel.

16. The system of claim 15, wherein the input string comprises a numeric string with the first base of 10, the fifth string comprises an alphanumeric string of the fourth base of 62 or 52.

17. The system of claim 15, wherein the security string of the second length of the second base comprises any of: a checksum, one or more characters of the checksum, metadata, a character length of the input string, a version number, a field type, or cyclic redundancy check (CRC) information.

18. The system of claim 15, wherein the second base is selected from any of: a numeric base of 10, an alphanumeric base of 62 or 52, or a base larger than 62 comprising numerals, alphabet characters, and special characters.

19. The system of claim 15, wherein the security string is generated by a hashing algorithm selected from a set of secure hash algorithms (SHA) comprising any of: MD5, SHA-1, SHA-2, and SHA-3.

20. The system of claim 15, wherein the performing the FPE on the third string of the third length comprises performing the FPE by an n-bit block cipher, an Advanced Encryption Standard (AES) algorithm, a Feistel network, or an algorithm defined by a FF1 standard or a FF3 standard.

* * * * *